(12) United States Patent
He et al.

(10) Patent No.: US 12,549,644 B2
(45) Date of Patent: Feb. 10, 2026

(54) MULTIMEDIA CONTENT PUSHING METHOD AND APPARATUS, COMPUTER DEVICE, AND STORAGE MEDIUM

(71) Applicant: BEIJING YOUZHUJU NETWORK TECHNOLOGY CO., LTD., Beijing (CN)

(72) Inventors: Pan He, Beijing (CN); Feng Han, Singapore (SG); Mutong Chen, Beijing (CN); Senyang Yu, Beijing (CN); Kunyang Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 43 days.

(21) Appl. No.: 18/759,269

(22) Filed: Jun. 28, 2024

(65) Prior Publication Data

US 2025/0007995 A1    Jan. 2, 2025

(30) Foreign Application Priority Data

Jun. 30, 2023    (CN) .......................... 202310799018.1

(51) Int. Cl.
| | | |
|---|---|---|
| *H04L 67/55* | (2022.01) | |
| *G06F 18/25* | (2023.01) | |
| *G06N 3/08* | (2023.01) | |
| *G06Q 30/0241* | (2023.01) | |
| *G06Q 30/0251* | (2023.01) | |
| *H04L 67/50* | (2022.01) | |

(52) U.S. Cl.
CPC .............. *H04L 67/55* (2022.05); *G06F 18/25* (2023.01); *G06N 3/08* (2013.01); *G06Q 30/0255* (2013.01); *G06Q 30/0277* (2013.01); *H04L 67/535* (2022.05)

(58) Field of Classification Search
None
See application file for complete search history.

(56) References Cited

U.S. PATENT DOCUMENTS

2019/0236679 A1    8/2019    Kumar et al.

FOREIGN PATENT DOCUMENTS

| CN | 110688581 A | * | 1/2020 | ......... G06F 16/9535 |
| CN | 111310056 A | * | 6/2020 | ......... G06F 16/9535 |

(Continued)

*Primary Examiner* — Lance Leonard Barry
(74) *Attorney, Agent, or Firm* — BakerHostetler

(57) ABSTRACT

A multimedia content pushing method and an apparatus, a computer device, and a storage medium are provided. The method includes: obtaining historical operation information of alternative users on a target multimedia content in a target historical time period and real-time operation information on the target multimedia content; determining a target sample user from the alternative users based on the historical operation information and the real-time operation information, and training a neural network model based on sample data composed of sample attribute information corresponding to the target sample user and multimedia attribute information of the target multimedia content to obtain a target neural network model, and in response to a target user of the first type triggering a preset push event, using the target neural network model to determine a push strategy, and pushing the target multimedia content based on the push strategy.

20 Claims, 2 Drawing Sheets

Obtaining historical operation information of a plurality of alternative users on a target multimedia content in a target historical time period and real-time operation information of the alternative users on the target multimedia content — S101

Determining a target sample user from the alternative users based on the historical operation information and the real-time operation information respectively corresponding to the plurality of alternative users, and training a neural network model to be trained based on sample data composed of sample attribute information corresponding to the target sample user and multimedia attribute information of the target multimedia content to obtain a target neural network model, where the target sample user includes an alternative user whose user type is converted from a first type to a second type in a case where the target multimedia content is pushed thereto — S102

In response to a target user of the first type triggering a preset push event, determining a push strategy of pushing the target multimedia content to the target user using the target neural network model, and pushing the target multimedia content based on the push strategy — S103

(56) References Cited

FOREIGN PATENT DOCUMENTS

| CN | 111597446 | A | * | 8/2020 | ......... | G06F 16/9535 |
| CN | 112989074 | A | | 6/2021 | | |
| CN | 113763112 | A | * | 12/2021 | ........... | G06F 18/214 |
| CN | 114461824 | A | * | 5/2022 | ........... | G06F 18/214 |
| WO | WO-2023115974 | A1 | * | 6/2023 | ........... | G06F 16/435 |

* cited by examiner

MULTIMEDIA CONTENT PUSHING METHOD AND APPARATUS, COMPUTER DEVICE, AND STORAGE MEDIUM

CROSS-REFERENCE TO RELATED APPLICATION

This application claims priority to Chinese Patent Application No. 202310799018.1, filed on Jun. 30, 2023, the entire disclosure of which is incorporated herein by reference as part of the present disclosure.

TECHNICAL FIELD

The present disclosure relates to the technical field of machining learning, and in particular, to a multimedia content pushing method and a multimedia content pushing apparatus, a computer device, and a storage medium.

BACKGROUND

Information streaming media has been increasingly popularized in people's life. An existing application related to the information streaming media, after being started by a user, may usually push a multimedia content the user may be interested in to the user on a home page. The pushed multimedia content is usually determined from historical records of searching for corresponding themes of multimedia contents in a certain historical time period or from historical operation information of the user on related other multimedia contents. Such a multimedia content push manner is invalid for the user in many cases and lacks pertinence.

SUMMARY

At least an embodiment of the present disclosure provides multimedia content pushing method, comprising: obtaining historical operation information of a plurality of alternative users on a target multimedia content in a target historical time period and real-time operation information of the alternative users on the target multimedia content; determining a target sample user from the plurality of alternative users based on the historical operation information and the real-time operation information of the plurality of alternative users, and training a neural network model to be trained based on sample data composed of sample attribute information corresponding to the target sample user and multimedia attribute information of the target multimedia content to obtain a target neural network model, wherein the target sample user comprises an alternative user whose user type is converted from a first type to a second type in a case where the target multimedia content is pushed thereto; and in response to a target user of the first type triggering a preset push event, using the target neural network model to determine a push strategy of pushing the target multimedia content to the target user, and pushing the target multimedia content based on the push strategy.

For example, the obtaining historical operation information of a plurality of alternative users on a target multimedia content in a target historical time period comprises: determining object attribute information of a content object corresponding to the target multimedia content; and determining the target historical time period corresponding to the target multimedia content based on the object attribute information, and obtaining the historical operation information of the plurality of alternative users on the target multimedia content in the target historical time period.

For example, obtaining real-time operation information of the alternative users on the target multimedia content comprises: for each of the plurality of alternative users and in each of a plurality of operation cycles corresponding to the alternative user, determining the operation information of the alternative user on the target multimedia content in each operation cycle; and obtaining the real-time operation information of each of the plurality of alternative users based on the operation information respectively corresponding to the plurality of operation cycles.

For example, the determining a target sample user from the plurality of alternative users based on the historical operation information and the real-time operation information of the plurality of alternative users comprises: for each of the plurality of alternative users, fusing the historical operation information and the real-time operation information of the alternative user to obtain target operation information of the alternative user; and in response to a target operation information of any alternative user meeting a preset condition, determining the alternative user as the target sample user, wherein the preset condition satisfies that the alternative user is converted from the first type to the second type.

For example, the first type comprises a shallow interaction group; the second type comprises an influenced group; and the preset condition comprises at least one of follows: an exposure count of the target multimedia content being greater than or equal to a first exposure count threshold, and an exposure count with an exposure duration longer than a first preset duration threshold being greater than a second exposure count threshold; a play duration of the target multimedia content being longer than a first play count threshold, and a play count with a play duration longer than a second preset duration threshold being greater than a preset play count threshold; a count of clicks made by the alternative user on the target multimedia content being greater than or equal to a preset click count threshold; a stay duration of an advertisement landing page corresponding to the target multimedia content being longer than a preset stay duration threshold; a count of likes given by the alternative user for the target multimedia content being greater than a preset like count threshold; a count of comments made by the alternative user on the target multimedia content being greater than or equal to a comment count threshold; and a count of sharing the target multimedia content by the alternative user being greater than or equal to a sharing count threshold.

For example, the in response to a target user of the first type triggering a preset push event, using the target neural network model to determine a push strategy of pushing the target multimedia content to the target user comprises: in response to the target user of the first type triggering the preset push event, using the target neural network model to determine a prediction result about the target user being converted from the first type to the second type after pushing the target multimedia content to the target user; and determining the push strategy of pushing the target multimedia content to the target user based on the prediction result.

For example, the using the target neural network model to determine a prediction result about the target user being converted from the first type to the second type after pushing the target multimedia content to the target user comprises: obtaining attribute information corresponding to the target user; and constituting data to be processed based on the attribute information and the multimedia attribute information of the target multimedia content, and inputting the data to be processed to the target neural network model to obtain the prediction result.

For example, after pushing the target multimedia content to the target user, the multimedia content pushing method further comprises: obtaining historical operation information and real-time operation information of the target user on the target multimedia content; and determining a conversion result of the target user from the first type to the second type with the historical operation information and the real-time operation information of the target user on the target multimedia content.

At least an embodiment of the present disclosure further provides a multimedia content pushing apparatus, comprising: an obtaining module configured to obtain historical operation information of a plurality of alternative users on a target multimedia content in a target historical time period and real-time operation information of the plurality of alternative users on the target multimedia content; a training module configured to determine a target sample user from the alternative users based on the historical operation information and the real-time operation information of the plurality of alternative users, and train a neural network model to be trained based on sample data composed of sample attribute information corresponding to the target sample user and multimedia attribute information of the target multimedia content to obtain a target neural network model, wherein the target sample user comprises an alternative user whose user type is converted from a first type to a second type in a case where the target multimedia content is pushed thereto; and a push module configured to, in response to a target user of the first type triggering a preset push event, determine a push strategy of pushing the target multimedia content to the target user using the target neural network model, and push the target multimedia content based on the push strategy.

At least an embodiment of the present disclosure further provides a computer device, comprising a processor and a memory, wherein the memory stores machine-readable instructions executable by the processor; the processor is configured to execute the machine-readable instructions stored on the memory; and the machine-readable instructions, when executed by the processor, cause the processor to perform the multimedia content pushing method by any one of the above embodiments.

At least an embodiment of the present disclosure further provides a non-transitory computer-readable storage medium, storing a computer program which, when run by a computer device, causes the computer device to perform the multimedia content pushing method by any one of the above embodiments.

BRIEF DESCRIPTION OF DRAWINGS

The accompanying drawings, which are hereby incorporated in and constitute a part of the present description, illustrate embodiments of the present disclosure, and together with the description, serve to explain the principles of the embodiments of the present disclosure. To describe the technical solutions in the embodiments of the present disclosure or in the prior art more clearly, the accompanying drawings required in the description of the embodiments or the prior art will be described briefly below. Apparently, other accompanying drawings can also be derived from these drawings by those ordinarily skilled in the art without creative efforts.

DETAILED DESCRIPTION

Figure 1:
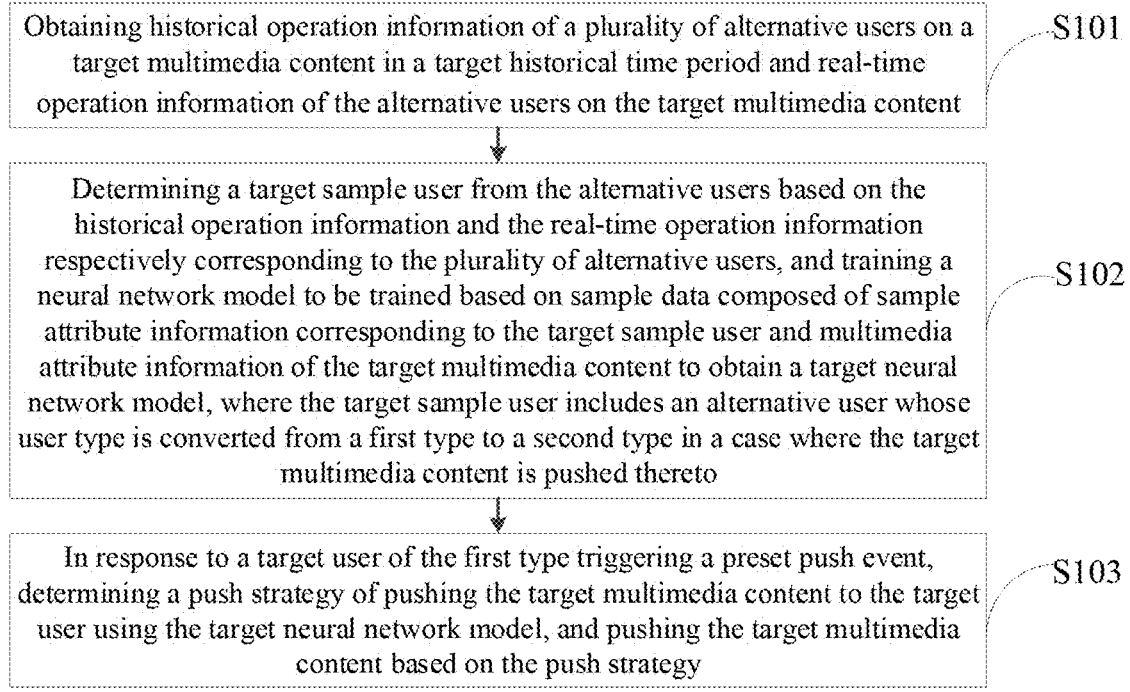
FIG. 1 illustrates a flowchart of a multimedia content pushing method provided by some embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Usually, the components of the embodiments of the present disclosure as described and illustrated herein could be arranged and designed in a wide variety of different configurations. Thus, the following detailed description of the embodiments of the disclosure is not intended to limit the protection scope of the disclosure, but is merely representative of optional embodiments of the disclosure. Based on the embodiments of the present disclosure, all other embodiments obtained by those skilled in the art without making creative labor belong to the scope of protection of the present disclosure.

Based on the above study, the present disclosure provides a multimedia content pushing method, using historical operation information on a target multimedia content in a target historical time period and real-time operation information on the target multimedia content of a plurality of alternative users, to select a target sample user from the plurality of alternative users, where the target sample user includes an alternative user whose user type is converted from a first type to a second type in a case where the target multimedia content is pushed thereto. A neural network model to be trained is then trained based on sample data composed of sample attribute information corresponding to the target sample user and multimedia attribute information of the target multimedia content to obtain a target neural network model. In a case where a target push event is triggered, whether the target multimedia content is pushed to the target user is determined using the target neural network model, so that more refined attribution prediction of the target multimedia content can be performed on the user being converted from the first type to the second type. A push strategy of pushing the target multimedia content to the user is determined based on a result of the attribution prediction. The effectiveness and pertinence of push are improved.

The shortcomings of the above solution are outcomes of practices and careful studies conducted by the inventors. Therefore, the process of discovering the above problems and the solutions proposed below in the present disclosure for the above problems should be regarded as contributions of the inventors to the present disclosure.

It should be noted that similar reference signs and letters represent similar items in the drawings below. Therefore, once an item is defined in one drawing, it does not need to be further defined and described in subsequent drawings.

It will be understood that before using the technical solutions disclosed in various embodiments of the present disclosure, a user should be notified of a type, a range of use, a usage scenario, etc. of personal information involved in the present disclosure in an appropriate manner in accordance with relevant laws and regulations, and these should be authorized by the user. For example, particularly, prompt information of requesting authorization may be sent to the user by means of a pop-up window or information push in a page, and the above-mentioned information may be used after the user agrees.

In order to facilitate the understanding of the embodiments of the present disclosure, firstly, an information searching method disclosed by an embodiment of the present disclosure is introduced in detail. A performing agent for the information searching method provided by the embodiment of the present disclosure is generally a terminal device having a certain computing power or other processing device, where the terminal device may be a user equipment (UE), a mobile device, a user terminal, a terminal, a personal digital assistant (PDA), a hand-held device, a computer device, and the like. In some possible implementations, the information searching method may be implemented by a processor calling computer-readable instructions stored on a memory.

The multimedia content pushing method provided by embodiments of the present disclosure is described below.

With reference to FIG. 1, there is shown a flowchart of a multimedia content provided by an embodiment of the present disclosure, including the following steps S101 to S103.

S101: obtaining historical operation information of a plurality of alternative users on a target multimedia content in a target historical time period and real-time operation information of the alternative users on the target multimedia content;

S102: determining a target sample user from the alternative users based on the historical operation information and the real-time operation information respectively corresponding to the plurality of alternative users, and training a neural network model to be trained based on sample data composed of sample attribute information corresponding to the target sample user and multimedia attribute information of the target multimedia content to obtain a target neural network model, where the target sample user includes an alternative user whose user type is converted from a first type to a second type in a case where the target multimedia content is pushed thereto; and S103: in response to a target user of the first type triggering a preset push event, determining a push strategy of pushing the target multimedia content to the target user using the target neural network model, and pushing the target multimedia content based on the push strategy.

Steps S101 to S103 are described in detail separately below.

For S101, a multimedia content in a specific implementation includes, for example, a video, a short video, an advertisement, a recommendation text, an image, and a combination of at least any two of them.

A short video, i.e., a short film video, is an Internet content propagation means, and generally refers to a video of less than 5 minutes propagating over a new Internet media. Compared with a short video, a video usually has a longer play duration. An advertisement may include any one of a video advertisement, an image-text advertisement, etc., and generally is a multimedia content for publicizing a product (also referred to as a content object) launched by a brand owner of the product. A recommendation text and an image may include, for example, texts, images, etc., included in notes posted by a user on a multimedia content platform after using some products.

The target multimedia content is selected, for example, from a plurality of multimedia contents, and posted for a certain content object to achieve a particular purpose. The content object may be construed as, for example, an object described by the multimedia content. The content object may include, for example, an entity object, such as a certain product and a certain brand, or may be a virtual object, such as a tour route of a scenery spot where people can go sightseeing, and a service.

Exemplarily, taking the content object being a brand product A as an example, there are a plurality of multimedia contents corresponding to the brand product A, and posting purposes corresponding to different multimedia contents may be the same or different. Exemplarily, the posting purpose of any multimedia content includes, for example, at least one of: cultural popularization and knowledge introduction, "influencing", sell, etc. Taking "influencing" as an example, "influencing" is a popular online term, which refers to introduce a product for others to ignite their desire to buy the product, and this process is referred to as "influencing". The target multimedia content includes, for example, a multimedia content corresponding to the product A posted for the purpose of "influencing", which includes, for example, an advertisement corresponding to the product A, an "influencing" video posted by other users, an "influencing" note, etc.

The target historical time period is, for example, a certain time period within a preset duration range from a current time. For example, based on a date corresponding to the current time, N days before the date are taken as the target historical time period. Different content objects may correspond to different target historical time periods. Specifically, an embodiment of the present disclosure provides obtaining the historical operation information of the plurality of alternative users on the target multimedia content in the target historical time period, including: determining object attribute information of a content object corresponding to the target multimedia content; and determining the target historical time period corresponding to the target multimedia content based on the object attribute information, and obtaining the historical operation information of the plurality of alternative users on the target multimedia content in the target time period.

Exemplarily, the object attribute information of the content object corresponding to the target multimedia content includes, for example, an object class to which the target multimedia content belongs, whether it is seasonal or not, service life, etc. The specific object attribute information may be set according to an actual requirement. Taking the object attribute information including the service life as an example, if the content object of the target multimedia content is a product having a long service life, such as a mobile phone and a digital camera, the duration of the corresponding target historical time period is 30 days; and if the content object of the target multimedia content is a product having a short service life, such as a food and a skin care product, the duration of the corresponding target historical time period is 14 days. For another example, taking the object attribute information including whether it is seasonal or not as an example, if the content object of the target multimedia content is a product such as seasonal fruits, the duration of the corresponding target historical time period is 7 days; and if the content object of the target multimedia content is non-seasonal other product, the duration of the corresponding target historical time period is 15 days.

The specific duration of the target historical time period may be set according to an actual requirement, which will not be defined in the embodiments of the present disclosure.

When determining the object attribute information of the content object corresponding to the target multimedia content, the content object may be determined firstly for example, and then the target multimedia content may be determined from multimedia contents corresponding to the content object based on the posting purpose of the multimedia contents corresponding to the content object.

When a push system pushes a multimedia content, push information will be generated. The push information includes first identification information corresponding to the target multimedia content, second identification information of a user to which the target multimedia content is pushed, and a push time. The push information corresponding to the target multimedia content in the target historical time period is selected using the first identification information and the push time. The second identification information is then read from the selected push information corresponding to the target multimedia content in the target historical time period, and the user corresponding to the second identification information is taken as an alternative user.

After the alternative user is determined, the target push information for the alternative user corresponding to the target multimedia content can be selected from the push information corresponding to the target multimedia content in the target historical time period using the second identification information corresponding to the alternative user. Moreover, the push information further includes operation information of the alternative user on the target multimedia content after receiving the pushed target multimedia content, such as whether or not to click, a duration of clicking playing, whether or not to give a like, whether or not to comment, whether or not to share, etc. The historical operation information of the alternative user on the target multimedia content in the target historical time period is then obtained using the selected target push information.

Exemplarily, assuming that target multimedia contents $a_1$ to $a_m$ are included, for the target multimedia content ai, the target historical time period includes T1 to T2, where T1 is the starting time of the target historical time period, and T2 is the ending time of the target historical time period.

The push information P1 belonging to the target historical time period is selected from the push information of multimedia contents based on the push time t corresponding to each piece of push information, and the starting time T1 and the ending time T2 of the target historical time period.

Then, the push information P2 corresponding to the target multimedia content ai is selected from the push information P1 using the first identification information of the target multimedia content ai.

For the push information in P2, the second identification information carried in each piece is then read, and then all target push information P3 corresponding to the second identification information is selected from P2 based on the second identification information.

The historical operation information of an alternative user U1 on the target multimedia content in the target historical time period is then obtained using the operation information of the alternative user U1 corresponding to the second identification information that is carried in the target push information P3.

The historical operation information includes, for example, at least one of:

s1: an exposure count of the target multimedia content, and/or a duration per exposure.

Here, the exposure count of the target multimedia content includes, for example, the number of times the target multimedia content is shown on a terminal screen corresponding to an alternative user, and a duration of showing each time.

Exemplarily, when a multimedia content is pushed to a user, a plurality of multimedia contents are usually pushed. The plurality of multimedia contents are arranged in a page in a certain manner. However, a display screen of a terminal device cannot show all the pushed multimedia contents at a time in many cases. If a certain multimedia content is shown on the display screen of the terminal device, it may be considered as an exposure of the multimedia content. If a certain multimedia content is pushed to the user but not displayed on the display screen of the terminal device, it may not be considered as an exposure.

A duration of an exposure is also referred as a display duration of the multimedia content on the display screen.

s2: a play count of the target multimedia content, or a duration per play.

Here, after the multimedia content is pushed to the user, the user may trigger the playing of the multimedia content by an operation such as clicking. After each play, the duration of this play may also be recorded.

s3: a count of clicks made by the alternative user on the target multimedia content.

Here, after the multimedia content is pushed to the user, the user may trigger the playing of the target multimedia content by the clicking operation; or, for part of automatically played multimedia contents, the user may trigger by clicking to enter an introduction page such as an advertisement landing page of the multimedia content.

s4: a stay duration of an advertisement landing page corresponding to the target multimedia content.

Here, after the target multimedia content is displayed on the display screen of the terminal device, the user may enter the advertisement landing page of the multimedia content by an operation such as clicking and sliding. At this time, the stay duration of the advertisement landing page corresponding to the target multimedia content may be recorded.

s5: a count of likes given by the alternative user for the target multimedia content.

s6: a count of comments made by the alternative user on the target multimedia content.

s7: a count of sharing the target multimedia content by the alternative user.

In another embodiment of the present disclosure, there is further provided a specific way of obtaining the real-time operation information of the alternative users on the target multimedia content, including: for each of the alternative users and in each of a plurality of operation cycles corresponding to the alternative user, determining the operation information of the alternative user on the target multimedia content in each operation cycle; and obtaining the real-time operation information of each alternative user based on the operation information respectively corresponding to the plurality of operation cycles.

In a specific implementation, the plurality of operation cycles corresponding to the alternative user may be, for example, a plurality of operation cycles within 1 day after the target historical time period. The duration of each operation cycle is 1 minute, 2 minutes, etc., which may be specifically determined according to an actual requirement.

For example, taking the duration of each operation cycle being 1 minute as an example, in a case where the target multimedia content is pushed to an alternative user within 1 day after the target historical time period, a corresponding push event can also be generated. In each operation cycle, real-time push information of the target multimedia content in the operation cycle is obtained. The operation information of the alternative user on the target multimedia content in the operation cycle is then obtained using the real-time push information.

Then, for the alternative user, minute level aggregation processing is performed on the respective operation information corresponding to the plurality of operation cycles to obtain the real-time operation information of the alternative user for the target multimedia content.

Here, the operation information in each piece of real-time push information recorded may include, for example, the count of clicks on the target multimedia content, the play duration, etc.

An information type included in the real-time operation information may also include at least one of s1 to s7 described above.

In this way, based on the above embodiments, the historical operation information of the plurality of alternative users on the target multimedia content in the target historical time period and the real-time operation information of the alternative users on the target multimedia content may be obtained.

For S102 described above, in a specific implementation, when determining the target sample user from the alternative users based on the historical operation information and the real-time operation information respectively corresponding to the plurality of alternative users, for example, the following way may be adopted: for each of the plurality of alternative users, fusing the historical operation information and the real-time operation information of the alternative user to obtain target operation information of the alternative user; and in response to a target operation information of any alternative user meeting a preset condition, determining the alternative user as the target sample user, wherein the preset condition satisfies that the alternative user is converted from the first type to the second type.

Specifically, information types included in the historical operation information and the real-time operation information may, for example, be the same or different, or may be the same only in part, which may be specifically determined according to an actual requirement and will not be defined in the embodiments of the present disclosure.

Exemplarily, in the case where the information types included in the historical operation information and the real-time operation information are the same, when fusing the historical operation information and the real-time operation information corresponding to each alternative user, for example, for each information type, values of the historical operation information and the real-time operation information under this information type may be added together.

In the case where the information types included in the historical operation information and the real-time operation information are completely different, for example, the information types of the historical operation information and the real-time operation information may be merged.

In the case where the information types included in the historical operation information and the real-time operation information are the same in part, for the same information type, values of the historical operation information and the real-time operation information under this information type are added together. For different information types, the information types of the historical operation information and the real-time operation information are merged.

After the historical operation information and the real-time operation information are fused to obtain the target operation information, whether the target operation information meets the preset condition may be determined.

According to an O-5A group stratification model, i.e., according to how close a group is to a brand, users are divided into different levels O and A1 to A5. That is, the type of each user is at least one of the above 6 types.

O (Opportunity) represents a public sphere group. A1 (Aware) represents a passively receiving group. A2 (Appeal) represents a shallow interaction group. A3 (Ask) represents an influenced group. A4 (Act) represents a brand first-purchase group. A5 (Advocate) represents a brand re-purchase group.

In an embodiment of the present disclosure, the first type is any one type other than O and A5 among the above 6 types.

The second type may be different when the first type is different. For example, when the first type is A1, the second type is A2; when the first type is A2, the second type is A3; when the first type is A3, the second type is A4; and when the first type is A4, the second type is A5. The first type and the second type may be specifically set according to different requirements. For different first types and second types, different preset conditions are determined.

Exemplarily, in a case where the first type is A2 and the second type is A3, the preset condition may include, for example, at least one of:

h1: an exposure count of the target multimedia content being greater than or equal to a first exposure count threshold, and an exposure count with an exposure duration longer than a first preset duration threshold being greater than to a second exposure count threshold.

For example, the exposure count of the target multimedia content is greater than or equal to 11, and the exposure count with the exposure duration longer than 5 s is greater than or equal to 2.

h2: a play duration of the target multimedia content being longer than a first play count threshold, and a play count with a play duration longer than a second preset duration threshold being greater than a preset play count threshold.

For example, the play duration of the target multimedia content is longer than 1 minute, and the play count with the play duration longer than 5 s is greater than or equal to 2.

h3: a count of clicks made by the alternative user on the target multimedia content being greater than or equal to a preset click count threshold.

For example, the count of clicks made by the alternative user on the target multimedia content is greater than or equal to 2.

h4: a stay duration of an advertisement landing page corresponding to the target multimedia content being longer than a preset stay duration threshold.

For example, the stay duration of the advertisement landing page corresponding to the target multimedia content is longer than 1 minute.

h5: a count of likes given by the alternative user for the target multimedia content being greater than a preset like count threshold.

For example, the count of likes given by the alternative user for the target multimedia content is greater than or equal to 2.

h6: a count of comments made by the alternative user on the target multimedia content being greater than or equal to a comment count threshold.

For example, the count of comments made by the alternative user on the target multimedia content is greater than or equal to 1.

h7: a count of sharing the target multimedia content by the alternative user being greater than or equal to a sharing count threshold.

For example, the count of sharing the target multimedia content by the alternative user is greater than or equal to 1.

The above-mentioned specific thresholds are merely examples, and other values may be specifically adopted, which may be specifically set according to actual requirements and will not be defined in the embodiments of the present disclosure.

In the case where the target operation information corresponding to an alternative user meets at least one of h1 to h7 described above, the alternative user is determined as the target sample user, which indicates that since the target multimedia content is pushed to the alternative user, the target sample user is converted from the shallow interaction group to the influenced group with respect to the content object corresponding to the target multimedia content.

After the target sample user is determined, the sample data is constituted based on the sample attribute information corresponding to the target sample user and the multimedia attribute information of the target multimedia content.

Here, the sample attribute information includes, for example, the historical operation information of the target sample user on the target multimedia content in the target historical time period, and/or other attribute information, such as a count of logins by the target sample user, a browsing duration for a multimedia content delivery platform, and purchase information for a product, which may be specifically determined according to an actual requirement and will not be defined in the embodiments of the present disclosure.

The multimedia attribute information of the target multimedia content may include, for example, a total play duration of the target multimedia content, a content quantity of a text, a title of the target multimedia content, a delivery frequency of the target multimedia content etc., which may also be specifically determined according to an actual requirement and will not be defined in the embodiments of the present disclosure.

After the sample data is constituted, the sample data is taken as positive sample data; meanwhile, random sampling may also be performed on non-target sample users of the alternative users, and negative sample data is constituted with the sample attribute information corresponding to the randomly sampled alternative user and the multimedia attribute information of the target multimedia content, so that a certain ratio of the positive sample data and the negative sample data is maintained, and a neural network to be trained is trained with the positive sample data and the negative sample data to obtain a target neural network.

The target neural network can predicate a specific prediction result about a user being converted from the first type to the second type after the target multimedia content is pushed to the user.

For S103, for example, the preset push event includes: entering an information stream push platform corresponding to the target multimedia content; performing a preset operation on the information showing page corresponding to the corresponding terminal device, such as a sliding operation in a preset direction, a double-click operation, or an operation of entering the information showing page; receiving a search operation for the content object corresponding to the target multimedia content from a search bar, which may be specifically determined according to an actual requirement and will not be defined in the embodiments of the present disclosure.

When determining the push strategy of pushing the target multimedia content to the target user using the target neural network, the following method may be adopted: in response to the target user of the first type triggering the preset push event, using the target neural network model to determine a prediction result about the target user being converted from the first type to the second type after pushing the target multimedia content to the target user; and determining the push strategy of pushing the target multimedia content to the target user based on the prediction result.

Specifically, for example, attribute information corresponding to the target user may be obtained. Data to be processed is constituted based on the attribute information and the multimedia attribute information of the target multimedia content, and the data to be processed is input to the target neural network to obtain the prediction result.

Here, the attribute information corresponding to the target user is of a similar information type to, for example, the sample attribute information corresponding to the target sample user, which will not be described here redundantly.

The obtained prediction result includes: for example, yes or no, where "yes" represents that the user may be converted from the first type to the second type after the target multimedia content is pushed thereto; and "no" represents that the user may not be converted from the first type to the second type after the target multimedia content is pushed thereto.

Moreover, the prediction result further includes for example, a probability that the user is converted from the first type to the second type after the multimedia content is pushed thereto. The prediction result may be specifically determined according to an actual requirement.

For the prediction results of different types, the determined push strategies may also be distinct.

Exemplarily, in the case where the prediction result includes yes or no, the determined push strategy includes, for example, push or not push.

That is, when the push strategy is "push", the target multimedia content may be pushed to the target user for example.

When the push strategy is "not push", the target multimedia content is not pushed to the target user for example. In this way, in the case where the prediction result is no, invalid push to the user may be avoided and the pertinence of the pushed multimedia content is improved.

In the case where the prediction result includes the probability that the user is converted from the first type to the second type after the multimedia content is pushed thereto, the push strategy includes, for example, whether or not to push, and a corresponding push frequency or a count of pushes in case of push.

The target multimedia content is pushed to the target user according to a specific push strategy. In this way, the probability that the target user is converted from the first type to the second type can be increased.

In another embodiment of the present disclosure, after pushing the target multimedia content to the target user, the method further includes: obtaining historical operation information and real-time operation information of the target user on the target multimedia content; and determining a conversion result of the target user from the first type to the second type with the historical operation information and the real-time operation information of the target user on the target multimedia content.

Here, a way of obtaining the historical operation information and the real-time operation information of the target user on the target multimedia content is similar to that of obtaining the historical operation information and the real-time operation information corresponding to the alternative user, which will not described redundantly in the embodiments of the present disclosure.

When determining the conversion result of the target user from the first type to the second type with the historical operation information and the real-time operation information of the target user on the target multimedia content, for example, whether the preset condition is met may be determined after the historical operation information and the real-time operation information of the target user on the target multimedia content are fused. In a case where the preset condition is met, the conversion result of the target user from the first type to the second type is determined as "successful conversion"; and in a case where the preset condition is not met, the conversion result of the target user from the first type to the second type is determined as "failed conversion".

In this way, the conversion result of the target user is collected as a new sample for re-training the target neural network model, thereby continuously improving the performance of the target neural network model. Moreover, the number of the converted target users may be counted and disclosed in real time, so that a specific delivery strategy of the target multimedia content can be adjusted in real time conveniently with the disclosed data.

It will be appreciated by those skilled in the art that in the method described above, the order of writing the steps does not mean a strict performing order to impose any limitation on the implementation process. The specific order of performing the steps should be determined by the functions thereof and a possible internal logic.

According to the same inventive concept, an embodiment of the present disclosure further provides a multimedia content pushing apparatus corresponding to the multimedia content pushing method. Since the principle of the apparatus to solve the problem in the embodiments of the present disclosure is the same as that of the multimedia content pushing method in the embodiments of the present disclosure, the implementation of the apparatus may refer to the implementation of the method, and repetitions may not be described herein.

Figure 2:
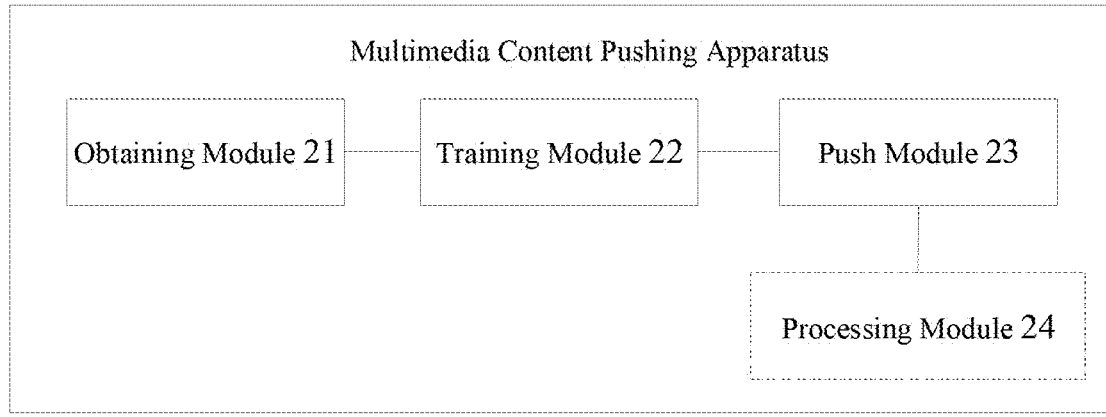
FIG. 2 illustrates a schematic diagram of a multimedia content pushing apparatus provided by some embodiments of the present disclosure.

With reference to FIG. 2, there is illustrated a schematic diagram of a multimedia content pushing apparatus provided by embodiments of the present disclosure. The apparatus includes: an obtaining module 21 configured to obtain historical operation information of a plurality of alternative users on a target multimedia content in a target historical time period and real-time operation information of the alternative users on the target multimedia content; a training module 22 configured to determine a target sample user from the alternative users based on the historical operation information and the real-time operation information respectively corresponding to the plurality of alternative users, and train a neural network model to be trained based on sample data composed of sample attribute information corresponding to the target sample user and multimedia attribute information of the target multimedia content to obtain a target neural network model, where the target sample user includes an alternative user whose user type is converted from a first type to a second type in a case where the target multimedia content is pushed thereto; and a push module 23 configured to, in response to a target user of the first type triggering a preset push event, use the target neural network model to determine a push strategy of pushing the target multimedia content to the target user, and push the target multimedia content based on the push strategy.

In a possible implementation, the obtaining module 21, when obtaining the historical operation information of the plurality of alternative users on the target multimedia content in the target historical time period, is configured to: determine object attribute information of a content object corresponding to the target multimedia content; and determine the target historical time period corresponding to the target multimedia content based on the object attribute information, and obtain the historical operation information of the plurality of alternative users on the target multimedia content in the target historical time period.

In a possible implementation, the obtaining module 21, when obtaining the real-time operation information of the alternative users on the target multimedia content, is configured to: for each of the alternative users and in each of a plurality of operation cycles corresponding to the alternative user, determine the operation information of the alternative user on the target multimedia content in the operation cycle; and obtain the real-time operation information of the alternative user based on the operation information respectively corresponding to the plurality of operation cycles.

In a possible implementation, the training module 22, when determining the target sample user from the alternative users based on the historical operation information and the real-time operation information respectively corresponding to the plurality of alternative users, is configured to: for each of the plurality of alternative users, fuse the historical operation information and the real-time operation information corresponding to the alternative user to obtain target operation information corresponding to the alternative user; and in response to the target operation information corresponding to any alternative user meeting a preset condition, determine the alternative user as the target sample user, where the preset condition satisfies that the alternative user is converted from the first type to the second type.

In a possible implementation, the first type includes a shallow interaction group; the second type includes an influenced group; and the preset condition includes at least one of: an exposure count of the target multimedia content being greater than or equal to a first exposure count threshold, and an exposure count with an exposure duration longer than a first preset duration threshold being greater than a second exposure count threshold; a play duration of the target multimedia content being longer than a first play count threshold, and a play count with a play duration longer than a second preset duration threshold being greater than a preset play count threshold; a count of clicks made by alternative users on the target multimedia content being greater than or equal to a preset click count threshold; a stay duration of an advertisement landing page corresponding to the target multimedia content being longer than a preset stay duration threshold; a count of likes given by alternative users for the target multimedia content being greater than a preset like count threshold; a count of comments made by alternative users on the target multimedia content being greater than or equal to a comment count threshold; and a count of sharing the target multimedia content by alternative users being greater than or equal to a sharing count threshold.

In a possible implementation, the push module 23, when using the target neural network model to determine the push strategy of pushing the target multimedia content to the target user in response to the target user of the first type triggering the preset push event, is configured to: in response to the target user of the first type triggering the preset push event, use the target neural network model to determine a prediction result about the target user being converted from the first type to the second type after pushing the target multimedia content to the target user; and determine the push strategy of pushing the target multimedia content to the target user based on the prediction result.

In a possible implementation, the push module 23, when using the target neural network model to determine a prediction result about the target user being converted from the first type to the second type after pushing the target multimedia content to the target user, is configured to: obtain attribute information corresponding to the target user; and constitute data to be processed based on the attribute information and the multimedia attribute information of the target multimedia content, and input the data to be processed to the target neural network to obtain the prediction result.

In a possible implementation, the apparatus further includes a processing module 24 configured to: after pushing the target multimedia content to the target user, obtain historical operation information and real-time operation information of the target user on the target multimedia content; and determine a conversion result of the target user from the first type to the second type with the historical operation information and the real-time operation information of the target user on the target multimedia content.

Regarding the descriptions of the processing flow of each module in the apparatus and an interactive flow between the modules, a reference may be made to the related descriptions in the above method embodiments, which will not be described in detail here.

Figure 3:
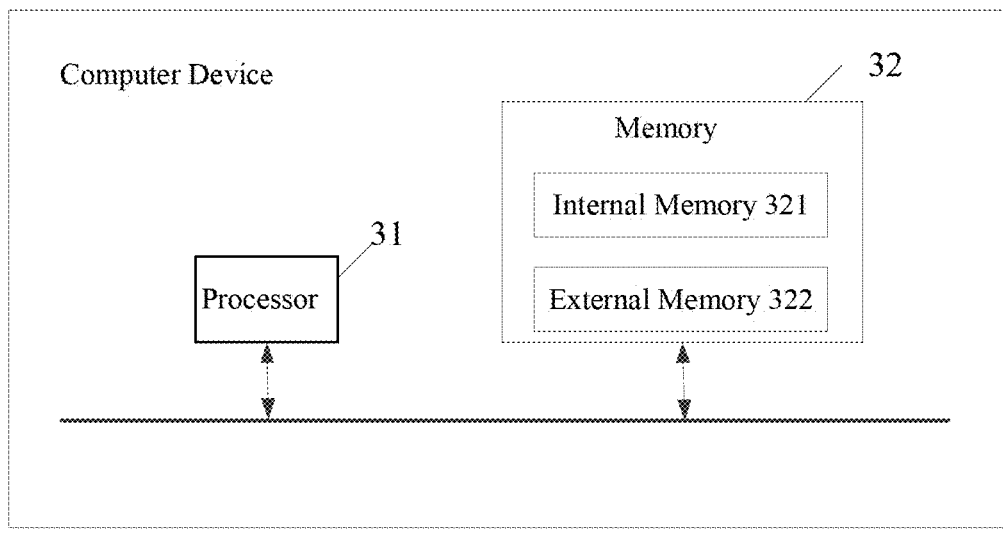
FIG. 3 illustrates a schematic diagram of a computer device provided by some embodiments of the present disclosure.

An embodiment of the present disclosure further provides a computer device. As shown in FIG. 3, there is shown a structural schematic diagram of a computer device provided by an embodiment of the present disclosure, including: a processor 31 and a memory 32, where the memory 32 stores machine-readable instructions executable by the processor 31; the processor 31 is configured to execute the machine-readable instructions stored on the memory 32; and the machine-readable instructions, when executed by the processor 31, cause the processor 31 to perform the following steps: obtaining historical operation information of a plurality of alternative users on a target multimedia content in a target historical time period and real-time operation information of the alternative users on the target multimedia content; determining a target sample user from the alternative users based on the historical operation information and the real-time operation information respectively corresponding to the plurality of alternative users, and training a neural network model to be trained based on sample data composed of sample attribute information corresponding to the target sample user and multimedia attribute information of the target multimedia content to obtain a target neural network model, where the target sample user includes an alternative user whose user type is converted from a first type to a second type in a case where the target multimedia content is pushed thereto; and in response to a target user of the first type triggering a preset push event, determining a push strategy of pushing the target multimedia content to the target user using the target neural network model, and pushing the target multimedia content based on the push strategy.

The memory 32 includes an internal memory 321 and an external memory 322. The internal memory 321 mentioned here is also referred to as an internal memory for temporarily storing operational data in the processor 31 and data exchanged with the external memory 322 such as a hard disk. The processor 31 exchanges data with the external memory 322 through the internal memory 321.

For the specific execution process of the instructions, a reference may be made to the steps of the multimedia content pushing method described in the embodiments of the present disclosure, which will not be described here redundantly.

An embodiment of the present disclosure further provides a computer-readable storage medium. The computer-readable storage medium stores a computer program. The computer program, when run by a processor, causes implementing the multimedia content pushing method in the above method embodiments. The storage medium may be a volatile or nonvolatile computer-readable storage medium.

A computer program product of the multimedia content pushing method provided in an embodiment of the present disclosure includes the computer-readable storage medium storing a program code. Instructions included in the program code may be used to perform the steps of the multimedia content pushing method in the above embodiments. For details, a reference may be made to the above method embodiments, which will not be described here redundantly.

The computer program product may be implemented specifically by hardware, software, or a combination thereof. In one optional embodiment, the computer program product is embodied as a computer storage medium. In another optional embodiment, the computer program product is embodied as a software product, e.g., a software development kit (SDK) and the like.

A person skilled in the art can clearly understand that, for convenience and brevity of description, a reference may be made to corresponding processes in the foregoing method embodiments for the specific working process of the apparatus described above, which will not be described here redundantly. In several embodiments provided in the present disclosure, it should be understood that the disclosed apparatus and method may be implemented in other manners. The apparatus embodiments described above are merely schematic. For example, the unit division is merely logical function division and may be another division in actual implementation. For another example, a plurality of units or components may be combined, or some features may be ignored or not performed. In addition, the displayed or discussed mutual couplings or direct couplings or communication connections may be implemented through some communication interfaces. The indirect couplings or communication connections between the apparatuses or units may be implemented in electrical, mechanical, or other forms.

The units described as separate parts may or may not be physically separate. Parts shown as units may or may not be physical units, which may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

If implemented in a form of a software functional unit and sold or used as a stand-alone product, functions may be stored in a nonvolatile computer-readable storage medium executable by a processor. Based on such understanding, the technical solutions of the present disclosure essentially, or a part contributing to the prior art, or part of the technical solutions may be implemented in a form of a software product. The computer software product is stored in a storage medium, and includes several instructions for enabling a computer device (which may be a personal computer, a server, a network device, or the like) to perform all or some steps of the method described in the embodiments of the present disclosure. The storage medium includes any medium capable of storing a program code, such as a USB flash disk, a mobile hard disk, a read-only memory (ROM), a random access memory (RAM), a magnetic disk, or an optical disk.

Finally, it should be noted that the above embodiments are merely specific implementations of the present disclosure, and are used to describe rather than limit the technical solutions of the present disclosure. The protection scope of the present disclosure is not limited thereto. Although the present disclosure is described in detail with reference to the above embodiments, it should be understood that a person of ordinary skill in the art can still make modifications to or readily figure out changes in the technical solutions described in the above embodiments, or make equivalent substitutions on some technical features therein. These modifications, changes, or substitutions do not make the essence of the corresponding technical solutions depart from the spirit and scope of the technical solutions of the embodiments of the present disclosure, and shall all fall within the protection scope of the present disclosure. Therefore, the protection scope of the present disclosure shall be subject to the protection scope of the claims.

The invention claimed is:

1. A multimedia content pushing method, comprising:
   obtaining historical operation information of a plurality of alternative users on a target multimedia content in a target historical time period and real-time operation information of the alternative users on the target multimedia content;
   determining a target sample user from the plurality of alternative users based on the historical operation information and the real-time operation information of the plurality of alternative users, and training a neural network model to be trained based on sample data composed of sample attribute information corresponding to the target sample user and multimedia attribute information of the target multimedia content to obtain a target neural network model, wherein the target sample user comprises an alternative user whose user type is converted from a first type to a second type in a case where the target multimedia content is pushed thereto; and
   in response to a target user of the first type triggering a preset push event, determining a push strategy of pushing the target multimedia content to the target user using the target neural network model, and pushing the target multimedia content based on the push strategy.

2. The multimedia content pushing method according to claim 1, wherein the obtaining historical operation information of a plurality of alternative users on a target multimedia content in a target historical time period comprises:
   determining object attribute information of a content object corresponding to the target multimedia content; and
   determining the target historical time period corresponding to the target multimedia content based on the object attribute information, and obtaining the historical operation information of the plurality of alternative users on the target multimedia content in the target historical time period.

3. The multimedia content pushing method according to claim 1, wherein obtaining real-time operation information of the alternative users on the target multimedia content comprises:
   for each of the plurality of alternative users and in each of a plurality of operation cycles corresponding to the alternative user, determining the operation information of the alternative user on the target multimedia content in each operation cycle; and
   obtaining the real-time operation information of each of the plurality of alternative users based on the operation information respectively corresponding to the plurality of operation cycles.

4. The multimedia content pushing method according to claim 1, wherein the determining a target sample user from the plurality of alternative users based on the historical operation information and the real-time operation information of the plurality of alternative users comprises:
   for each of the plurality of alternative users, fusing the historical operation information and the real-time operation information of the alternative user to obtain target operation information of the alternative user; and
   in response to a target operation information of any alternative user meeting a preset condition, determining the alternative user as the target sample user, wherein the preset condition satisfies that the alternative user is converted from the first type to the second type.

5. The multimedia content pushing method according to claim 4, wherein the first type comprises a shallow interaction group; the second type comprises an influenced group; and
   the preset condition comprises at least one of follows:
   an exposure count of the target multimedia content being greater than or equal to a first exposure count threshold, and an exposure count with an exposure duration longer than a first preset duration threshold being greater than a second exposure count threshold;
   a play duration of the target multimedia content being longer than a first play count threshold, and a play count with a play duration longer than a second preset duration threshold being greater than a preset play count threshold;
   a count of clicks made by the alternative user on the target multimedia content being greater than or equal to a preset click count threshold;
   a stay duration of an advertisement landing page corresponding to the target multimedia content being longer than a preset stay duration threshold;
   a count of likes given by the alternative user for the target multimedia content being greater than a preset like count threshold;
   a count of comments made by the alternative user on the target multimedia content being greater than or equal to a comment count threshold; and
   a count of sharing the target multimedia content by the alternative user being greater than or equal to a sharing count threshold.

6. The multimedia content pushing method according to claim 1, wherein the in response to a target user of the first type triggering a preset push event, determining a push strategy of pushing the target multimedia content to the target user using the target neural network model comprises:
   in response to the target user of the first type triggering the preset push event, using the target neural network model to determine a prediction result about the target user being converted from the first type to the second type after pushing the target multimedia content to the target user; and determining the push strategy of pushing the target multimedia content to the target user based on the prediction result.

7. The multimedia content pushing method according to claim 6, wherein the using the target neural network model to determine a prediction result about the target user being converted from the first type to the second type after pushing the target multimedia content to the target user comprises:

obtaining attribute information corresponding to the target user; and constituting data to be processed based on the attribute information and the multimedia attribute information of the target multimedia content, and inputting the data to be processed to the target neural network model to obtain the prediction result.

8. The multimedia content pushing method according to claim 1, after pushing the target multimedia content to the target user, further comprising:

obtaining historical operation information and real-time operation information of the target user on the target multimedia content; and determining a conversion result of the target user from the first type to the second type with the historical operation information and the real-time operation information of the target user on the target multimedia content.

9. The multimedia content pushing method according to claim 8, further comprising:

using the conversion result to retrain the target neural network model.

10. The multimedia content pushing method according to claim 1, wherein the training a neural network model to be trained based on sample data composed of sample attribute information corresponding to the target sample user and multimedia attribute information of the target multimedia content to obtain a target neural network model, comprises:

taking the sample data as positive sample data; performing random sampling on non-target sample users of the plurality of alternative users and constituting negative sample data with sample attribute information corresponding to the randomly sampled alternative users and the multimedia attribute information of the target multimedia content, to maintain a certain ratio of the positive sample data and the negative sample data, and training the neural network to be trained with the positive sample data and the negative sample data to obtain the target neural network model.

11. A computer device, comprising a processor and a memory, wherein the memory stores machine-readable instructions executable by the processor; the processor is configured to execute the machine-readable instructions stored on the memory; and the machine-readable instructions, when executed by the processor, cause the processor to perform a multimedia content pushing method comprising:

obtaining historical operation information of a plurality of alternative users on a target multimedia content in a target historical time period and real-time operation information of the alternative users on the target multimedia content;

determining a target sample user from the plurality of alternative users based on the historical operation information and the real-time operation information of the plurality of alternative users, and training a neural network model to be trained based on sample data composed of sample attribute information corresponding to the target sample user and multimedia attribute information of the target multimedia content to obtain a target neural network model, wherein the target sample user comprises an alternative user whose user type is converted from a first type to a second type in a case where the target multimedia content is pushed thereto; and in response to a target user of the first type triggering a preset push event, determining a push strategy of pushing the target multimedia content to the target user using the target neural network model, and pushing the target multimedia content based on the push strategy.

12. The computer device according to claim 11, wherein the obtaining historical operation information of a plurality of alternative users on a target multimedia content in a target historical time period comprises:

determining object attribute information of a content object corresponding to the target multimedia content; and determining the target historical time period corresponding to the target multimedia content based on the object attribute information, and obtaining the historical operation information of the plurality of alternative users on the target multimedia content in the target historical time period.

13. The computer device according to claim 11, wherein obtaining real-time operation information of the alternative users on the target multimedia content comprises:

for each of the plurality of alternative users and in each of a plurality of operation cycles corresponding to the alternative user, determining the operation information of the alternative user on the target multimedia content in each operation cycle; and obtaining the real-time operation information of each of the plurality of alternative users based on the operation information respectively corresponding to the plurality of operation cycles.

14. The computer device according to claim 11, wherein the determining a target sample user from the plurality of alternative users based on the historical operation information and the real-time operation information of the plurality of alternative users comprises:

for each of the plurality of alternative users, fusing the historical operation information and the real-time operation information of the alternative user to obtain target operation information of the alternative user; and in response to a target operation information of any alternative user meeting a preset condition, determining the alternative user as the target sample user, wherein the preset condition satisfies that the alternative user is converted from the first type to the second type.

15. The computer device according to claim 14, wherein the first type comprises a shallow interaction group; the second type comprises an influenced group; and the preset condition comprises at least one of follows:

an exposure count of the target multimedia content being greater than or equal to a first exposure count threshold, and an exposure count with an exposure duration longer than a first preset duration threshold being greater than a second exposure count threshold;

a play duration of the target multimedia content being longer than a first play count threshold, and a play count with a play duration longer than a second preset duration threshold being greater than a preset play count threshold;

a count of clicks made by the alternative user on the target multimedia content being greater than or equal to a preset click count threshold;
a stay duration of an advertisement landing page corresponding to the target multimedia content being longer than a preset stay duration threshold;
a count of likes given by the alternative user for the target multimedia content being greater than a preset like count threshold;
a count of comments made by the alternative user on the target multimedia content being greater than or equal to a comment count threshold; and
a count of sharing the target multimedia content by the alternative user being greater than or equal to a sharing count threshold.

16. A non-transitory computer-readable storage medium, storing a computer program which, when run by a computer device, causes the computer device to perform a multimedia content pushing method comprising:
obtaining historical operation information of a plurality of alternative users on a target multimedia content in a target historical time period and real-time operation information of the alternative users on the target multimedia content;
determining a target sample user from the plurality of alternative users based on the historical operation information and the real-time operation information of the plurality of alternative users, and training a neural network model to be trained based on sample data composed of sample attribute information corresponding to the target sample user and multimedia attribute information of the target multimedia content to obtain a target neural network model, wherein the target sample user comprises an alternative user whose user type is converted from a first type to a second type in a case where the target multimedia content is pushed thereto; and
in response to a target user of the first type triggering a preset push event, determining a push strategy of pushing the target multimedia content to the target user using the target neural network model, and pushing the target multimedia content based on the push strategy.

17. The storage medium according to claim 16, wherein the obtaining historical operation information of a plurality of alternative users on a target multimedia content in a target historical time period comprises:
determining object attribute information of a content object corresponding to the target multimedia content; and
determining the target historical time period corresponding to the target multimedia content based on the object attribute information, and obtaining the historical operation information of the plurality of alternative users on the target multimedia content in the target historical time period.

18. The storage medium according to claim 16, wherein obtaining real-time operation information of the alternative users on the target multimedia content comprises:
for each of the plurality of alternative users and in each of a plurality of operation cycles corresponding to the alternative user, determining the operation information of the alternative user on the target multimedia content in each operation cycle; and
obtaining the real-time operation information of each of the plurality of alternative users based on the operation information respectively corresponding to the plurality of operation cycles.

19. The storage medium according to claim 16, wherein the determining a target sample user from the plurality of alternative users based on the historical operation information and the real-time operation information of the plurality of alternative users comprises:
for each of the plurality of alternative users, fusing the historical operation information and the real-time operation information of the alternative user to obtain target operation information of the alternative user; and
in response to a target operation information of any alternative user meeting a preset condition, determining the alternative user as the target sample user, wherein the preset condition satisfies that the alternative user is converted from the first type to the second type.

20. The storage medium according to claim 19, wherein the first type comprises a shallow interaction group; the second type comprises an influenced group; and
the preset condition comprises at least one of follows:
an exposure count of the target multimedia content being greater than or equal to a first exposure count threshold, and an exposure count with an exposure duration longer than a first preset duration threshold being greater than a second exposure count threshold;
a play duration of the target multimedia content being longer than a first play count threshold, and a play count with a play duration longer than a second preset duration threshold being greater than a preset play count threshold;
a count of clicks made by the alternative user on the target multimedia content being greater than or equal to a preset click count threshold;
a stay duration of an advertisement landing page corresponding to the target multimedia content being longer than a preset stay duration threshold;
a count of likes given by the alternative user for the target multimedia content being greater than a preset like count threshold;
a count of comments made by the alternative user on the target multimedia content being greater than or equal to a comment count threshold; and
a count of sharing the target multimedia content by the alternative user being greater than or equal to a sharing count threshold.

* * * * *